(12) United States Patent
Gupta et al.

(10) Patent No.: US 12,707,426 B2
(45) Date of Patent: Aug. 11, 2026

(54) DYNAMIC VEHICLE BASED ULTRA-WIDE BAND ANCHORS

(71) Applicant: Ford Global Technologies, LLC, Dearborn, MI (US)

(72) Inventors: Somak Datta Gupta, Novi, MI (US); Arpita Chand, Corvallis, OR (US)

(73) Assignee: Ford Global Technologies, LLC, Dearborn, MI (US)

( * ) Notice: Subject to any disclaimer, the term of this patent is extended or adjusted under 35 U.S.C. 154(b) by 326 days.

(21) Appl. No.: 18/472,554

(22) Filed: Sep. 22, 2023

(65) Prior Publication Data

US 2025/0106809 A1 Mar. 27, 2025

(51) Int. Cl.
*H04W 64/00* (2009.01)
*G01S 5/02* (2010.01)

(52) U.S. Cl.
CPC ......... *H04W 64/003* (2013.01); *G01S 5/0284* (2013.01)

(58) Field of Classification Search
None
See application file for complete search history.

(56) References Cited

U.S. PATENT DOCUMENTS 11,082,809 B1 * 8/2021 Burowski ............ H04W 8/005
11,272,559 B2 3/2022 Smith
11,470,571 B2 10/2022 Henry et al.
2022/0070612 A1 * 3/2022 Henry .................. H04B 1/7163
2022/0070816 A1 * 3/2022 Henry ....................... G01S 5/14
2022/0191889 A1 * 6/2022 Bansal .............. H04W 28/0263
2024/0125912 A1 * 4/2024 Choi ....................... G01S 13/46
2024/0147242 A1 * 5/2024 Choi ..................... H04W 12/06

FOREIGN PATENT DOCUMENTS

CN 204442708 U 7/2015
CN 116156418 A * 5/2023 ............. H04W 4/02
DE 102016217532 A1 3/2018
WO 2023120881 A1 6/2023
WO WO-2023164384 A1 * 8/2023 ............. H04W 8/22

* cited by examiner

*Primary Examiner* — Adolf Dsouza

(74) *Attorney, Agent, or Firm* — Joseph Zane; Brooks Kushman P.C.

(57) ABSTRACT

Localization is performed using a dynamic mesh of vehicle-based Ultra-Wide Band (UWB) anchors. One or more vehicle-based UWB anchors are detected using fixed-location infrastructure UWB anchors, the one or more vehicle-based UWB anchors being components of a vehicle used for access control to the vehicle. The one or more vehicle-based UWB anchors are joined to a mesh of UWB anchors for locating mobile devices, the mesh of UWB anchors including both the fixed-location infrastructure UWB anchors and the dynamic vehicle-based UWB anchors. The mesh of UWB anchors is used to determine an absolute position of a mobile device.

20 Claims, 7 Drawing Sheets

Addresses
304
118
114B
114D
302
302
306
114A
114C
302
302
300
116B
116D
116A
116C

DYNAMIC VEHICLE BASED ULTRA-WIDE BAND ANCHORS

TECHNICAL FIELD

Aspects of the disclosure relate to dynamic vehicle-based Ultra-Wide Band (UWB) anchors.

BACKGROUND

Automotive customers have embraced Passive Entry and Passive Start (PEPS) systems, as these systems allow customers to enter the vehicle and drive away without having to physically handle a key. Phone-as-a-key (PaaK) allows the use of a smartphone to act as both a passive key and to provide traditional key fob functions such as unlock, lock, remote start, and lift gate access. PaaK may be implemented using Bluetooth Low Energy (BLE), which is an inbuilt technology in most smartphones on the market. The Connected Car Consortium (CCC) is working to implement UWB for phone localization to provide better localization compared to BLE localization approaches. UWB is an IEEE 802.15.4a/z standard technology optimized for location-based applications.

SUMMARY

In one or more illustrative examples, a method for localization using a dynamic mesh of vehicle-based Ultra-Wide Band (UWB) anchors, includes detecting one or more vehicle-based UWB anchors using fixed-location infrastructure UWB anchors, the one or more vehicle-based UWB anchors being components of a vehicle used for access control to the vehicle; joining the one or more vehicle-based UWB anchors to a mesh of UWB anchors for locating mobile devices, the mesh of UWB anchors including both the fixed-location infrastructure UWB anchors and the vehicle-based UWB anchors; and using the mesh of UWB anchors to determine an absolute position of a mobile device.

In one or more illustrative examples, a system for localization using a dynamic mesh of vehicle-based Ultra-Wide Band (UWB) anchors includes a plurality of fixed-location infrastructure UWB anchors and a UWB gateway. The UWB gateway is configured to detect one or more vehicle-based UWB anchors using the fixed-location infrastructure UWB anchors, the one or more vehicle-based UWB anchors being components of a vehicle used for access control to the vehicle, join the one or more vehicle-based UWB anchors to a mesh of UWB anchors for locating mobile devices, the mesh of UWB anchors including both the fixed-location infrastructure UWB anchors and the vehicle-based UWB anchors, and use the mesh of UWB anchors to determine an absolute position of a mobile device.

In one or more illustrative examples, a non-transitory computer-readable medium includes instructions for localization using a dynamic mesh of vehicle-based Ultra-Wide Band (UWB) anchors that, when executed by a UWB gateway, cause the UWB gateway to perform operations including to detect one or more vehicle-based UWB anchors using fixed-location infrastructure UWB anchors, the one or more vehicle-based UWB anchors being components of a vehicle used for access control to the vehicle; join the one or more vehicle-based UWB anchors to a mesh of UWB anchors for locating mobile devices, the mesh of UWB anchors including both the fixed-location infrastructure UWB anchors and the dynamic vehicle-based UWB anchors, including to maintain addresses of each of the UWB anchors in the mesh; and use the mesh of UWB anchors to determine an absolute position of a mobile device, including to send the addresses to the mobile device to allow the mobile device to perform ranging between the mobile device and each of the UWB anchors in the mesh and to determine the absolute position of the mobile device using a relative position of the mobile device determined using the mesh of UWB anchors and information regarding locations of the UWB anchors of the mesh.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is desirable to attain high accuracy positioning of vehicles and vulnerable road users (VRU), especially at busy, connected road intersections. Yet, many real-time tracking/location technologies have disadvantages. For example, global navigation satellite system (GNSS) may have a large error margin in an urban canyon setting. WiFi and Bluetooth/BLE positioning may be unable to achieve the required precision and connection stability. While connected intersections may already have several smart sensors installed, installation of additional sensing hardware, such as light detection and ranging (LIDAR) sensors or cameras at the intersection, can also be expensive and require additional maintenance.

An enhanced approach may utilize a dynamic mesh of UWB anchors to provide real-time, reliable and accurate location tracking of low speed VRUs. Many vehicles already have or plan to be equipped with UWB anchors inside the vehicle. These anchors may aid in features such as PaaK key to locate the presence of a user around the vehicle. These preexisting in-vehicle UWBs anchors may be used to dynamically enhance the location accuracy of UWB tags/VRUs at an intersection. Vehicles that are stopped at a traffic light or parked near the intersection may seamlessly participate with the fixed infrastructure UWB anchors, thereby increasing accuracy and coverage of the UWB system. This may aid in resource scaling of the location system in situations where vehicles are present.

Figure 1:
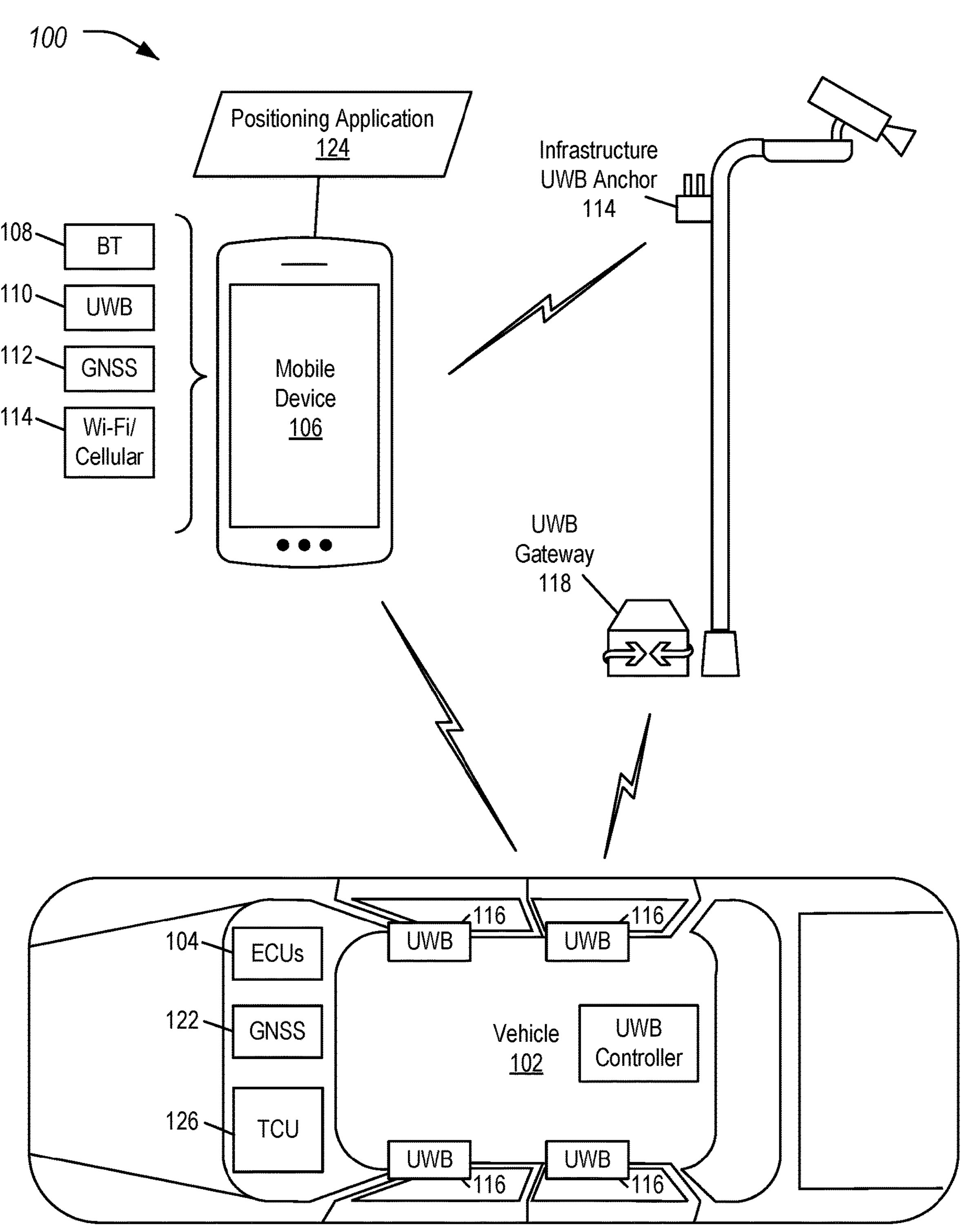
FIG. 1 illustrates an example system configured for precise positioning using dynamic vehicle-based UWB anchors.

FIG. 1 illustrates an example system 100 configured for precise positioning using dynamic vehicle-based UWB anchors 116. As shown, a vehicle 102 includes various electronic control units (ECUs) 104 supporting the functionality of the vehicle 102. The mobile device 106 includes communications functionality such as a mobile UWB transceiver 108, and a mobile GNSS controller 110. The vehicle 102 also includes passive entry components configured to interact with the communications functionality of the mobile device 106, including an array of vehicle-based UWB anchors 116, a UWB controller 120, and a vehicle GNSS controller 122. As explained in detail herein, a positioning application 124 installed to the mobile device 106 may interact with a telematics control unit (TCU) 126 of the vehicle 102 to provide for vehicle-based UWB anchor 116 positioning. It should be noted that the system 100 is only an example, and more, fewer, and/or differently located components may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The vehicle 102 may include a plurality of ECUs 104 configured to perform and manage various vehicle 102 functions under the power of the vehicle 102 battery and/or drivetrain. In some examples, the ECUs 104 may be discrete devices. However, the vehicle ECUs 104 may share physical hardware, firmware, and/or software, such that the functionality from multiple ECUs 104 may be integrated into a single ECU 104 or distributed across a plurality of ECUs 104. The vehicle ECUs 104 may include various vehicle 102 components configured to receive updates of associated software, firmware, or configuration settings.

As some non-limiting vehicle ECUs 104 examples: a powertrain control module (PCM) may be configured to control engine and transmission components; an antilock system (ABS) controller configured to control stopping and traction control components; an electric power-assisted steering (EPAS) controller may be configured to control steering assistance and adjust pull or drift compensation functions; advanced driver assistance systems (ADAS) such as adaptive cruise control or automated stopping; and a headlamp control module (HCM) may be configured to control light on/off settings. The ECUs 104 may also include other powertrain or chassis components, an infotainment system configured to support voice command and BLUETOOTH interfaces with the driver and driver carry-on devices (e.g., the SYNC system provided by Ford Motor Company of Dearborn, MI), a connectivity controller such as a TCU 126 configured to utilize an embedded modem to access networked devices external to the vehicle 102, electromechanical body controllers such as window or lock actuators, and trailer controller components such as light control and sensor data to support connected trailers.

The mobile device 106 may be any of various types of portable computing device, such as cellular phones, tablet computers, smart watches, laptop computers, portable music players, key fob, or other such devices brought into the vehicle 102 and having processing and communications capabilities. The mobile device 106 may include one or more processors configured to execute computer instructions, and a storage medium on which the computer-executable instructions and/or data may be maintained.

The mobile device 106 may include various wireless transceivers, such as a mobile UWB transceiver 108 configured to provide UWB functionality to the mobile device 106, a mobile GNSS controller 110 configured to provide location services to the mobile device 106, as well as other functionality such as Wi-Fi and/or cellular transceivers 112 configured to provide wide area communications functionality to the mobile device 106.

The mobile device 106 may be configured to use the mobile UWB transceiver 108 to compute the position of the mobile device 106. For example, the environment surrounding the vehicles 102 and mobile devices 106 may include one or more infrastructure UWB anchors 114. In some examples, infrastructure UWB anchors 114 are mounted at intersections. In an intersection example, the infrastructure UWB anchors 114, may be used to aid in localizing VRUs who carry a mobile device 106. These infrastructure UWB anchors 114 may form a relative coordinate system around the intersection. The mobile UWB transceiver 108 may calculate the relative position of the mobile device 106 with respect to the infrastructure UWB anchors 114 using on techniques such as two-way ranging, phase difference of arrival, etc. A minimum of three infrastructure UWB anchors 114 may be required to calculate the relative position of the mobile UWB transceiver 108 operating as a UWB tag. Significantly, the greater the quantity of infrastructure UWB anchors 114 present, the higher the accuracy of the determined location of the mobile device 106.

The infrastructure UWB anchors 114 may detect UWB pulses emitted by the mobile UWB transceiver 108 and forward them to a UWB gateway 118 for calculating tag positions (e.g., the location of the mobile device 106). In an example, the infrastructure UWB anchors 114 may forward the captured information to the UWB gateway 118 over a wired or wireless connection provided by the infrastructure. The UWB gateway 118 may accordingly make the locations of detected devices available wirelessly to vehicles 102 and/or mobile devices 106 in range of the UWB gateway 118.

In addition to being equipped with TCUs 126 and vehicle GNSS controllers 122, the vehicles 102 may also include vehicle-based UWB anchors 116 for proximity detection services such as PaaK. In some examples, the vehicle 102 may include a set of four vehicle-based UWB anchors 116 arranged into a 2×2 array around the cabin of the vehicle 102, but other quantities and locations of vehicle-based UWB anchors 116 are possible.

The vehicle 102 may use the array of vehicle-based UWB anchors 116 to facilitate location services between the mobile device 106 and the vehicle 102. As shown, the vehicle 102 includes UWB controller 120 configured to utilize the vehicle-based UWB anchors 116 perform messaging between the mobile UWB transceiver 108 of the mobile device 106 and the vehicle 102. As compared to BLE, UWB can provide for more precise location determination. For instance, UWB can measure distance and location to an accuracy of on the order of 5 to 10 cm, while Wi-Fi, BLUETOOTH, and other narrowband radio systems typically reach an accuracy on the order of meters.

The mobile device 106 may also include a display configured to provide a user interface to a user. In some examples, the display may be touch-sensitive, and may be further configured to receive input from the user. Additionally, a positioning application 124 may include instructions that, when executed by the one or more processors of the mobile device 106, cause the mobile device 106 to perform operations to facilitate access to the vehicle 102. In an example, the positioning application 124 may cause the mobile device 106 to display a user interface to the display including controls like those of a key fob (e.g., lock, unlock, start, etc.).

In another example, the positioning application 124 may cause the mobile device 106 to interact as a passive entry device with the vehicle 102, providing presence information to the UWB controller 120 that allows the vehicle 102 to detect that an authorized user of the vehicle 102 is nearby and/or approaching. By executing the positioning application 124 to control communication of the mobile device 106 with the vehicle 102, the mobile device 106 may be used to unlock, start, activate vehicle 102 features, or otherwise access the vehicle 102.

The positioning application 124 may allow for the authentication of the mobile device 106 to the vehicle 102. The authentication of the mobile device 106 to vehicles 102 may utilize a PaaK feature implementation, ensuring a secure connection between the user mobile device 106 and the UWB controller 120, whereby the user position can be localized utilizing the vehicle-based UWB anchors 116, and features of the vehicle 102 may be activated responsive to user presence, such as various ECUs 104, door locks, or the ignition interlock.

The positioning application 124 may also be used to localize the position of the user of the mobile device 106, and to provide that location to other traffic participants to ensure the location of the VRU is available. This may increase the security of the VRU when the VRU is traveling.

Figure 2:
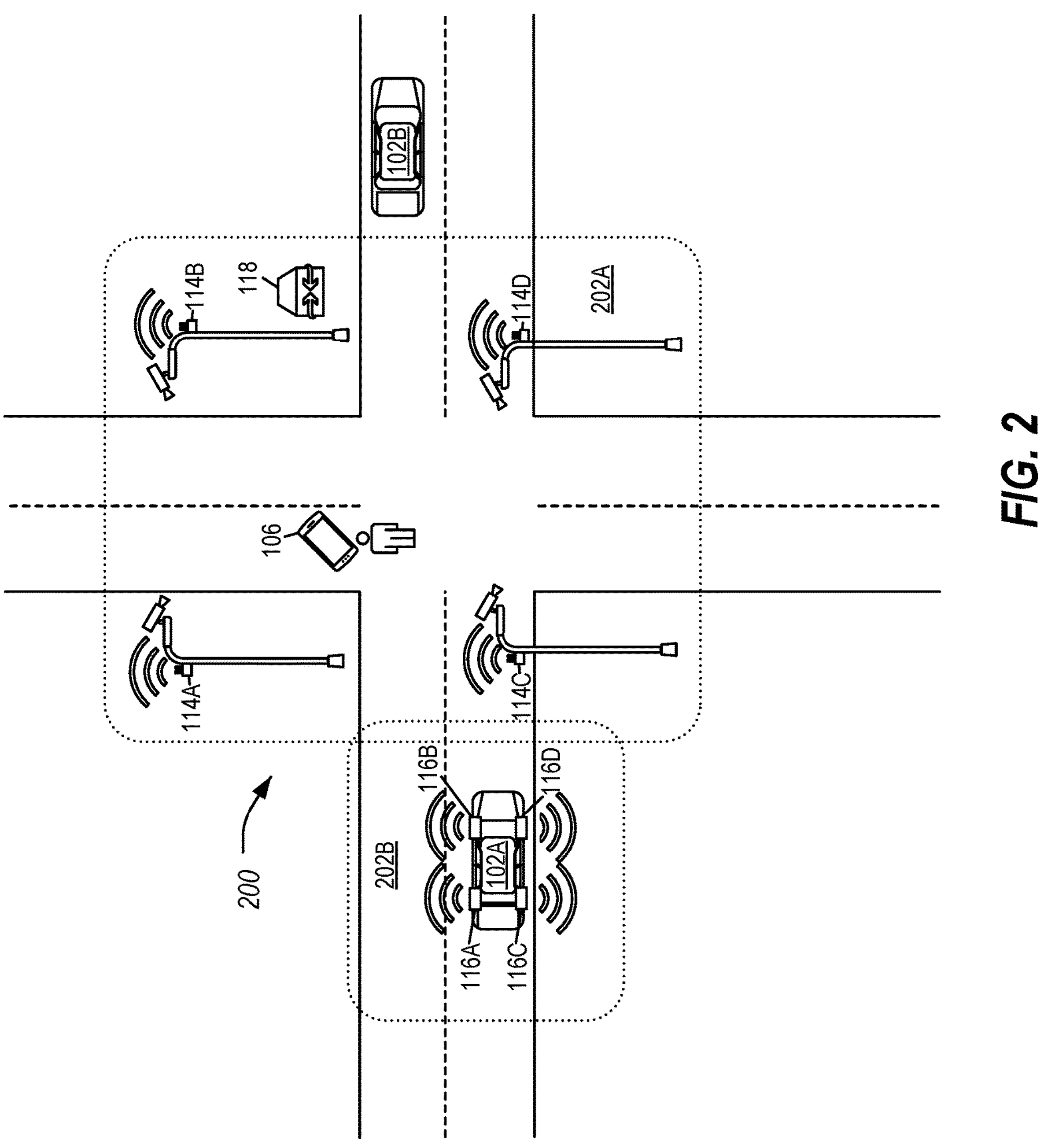
FIG. 2 illustrates an example of an intersection including infrastructure UWB anchors as well as vehicle-based UWB anchors.

FIG. 2 illustrates an example of an intersection 200 including infrastructure UWB anchors 114 as well as vehicle-based UWB anchors 116. A mobile device 106 is shown at the intersection 200, with its mobile UWB transceiver 108 configured to operate as a tag. The mobile device 106 may be carried by a VRU, in an example. The infrastructure UWB anchors 114 and vehicle-based UWB anchors 116 may be merged to act as a single UWB sensing network. The coverage and accuracy of this extended network may be enhanced as compared to a pure intersection-based system, resulting in better localization of VRUs in the increased coverage area.

The intersection 200 as shown includes four infrastructure UWB anchors 114 (e.g., in this example UWB anchors 114A, 114B, 114C, and 114D, one at each corner of the intersection 200). These infrastructure UWB anchors 114 collectively provide for a first coverage area 202A in which the location of the mobile device 106 may be determined.

Additionally, a vehicle 102A is located near the intersection 200. This vehicle 102A may be stopped at the intersection 200 or in another example may be parked on the side of the road near the intersection 200. The vehicle 102A may include an array of the vehicle-based UWB anchors 116 (e.g., in this example vehicle-based UWB anchors 116, one at each corner of the cabin of the vehicle 102A). These vehicle-based UWB anchors 116 collectively provide for a second coverage area 202B within which the location of the mobile device 106 may be determined.

The vehicle-based UWB anchors 116 may be identified, located, and added to the location determination of the mobile device 106. Those identified vehicle-based UWB anchors 116 may be present in vehicles 102 which are located within a distance from the intersection 200, such as vehicles 102 that are stopped at a traffic light, vehicles 102 that are parked near the intersection 200, etc. Thus, the UWB gateway 118 may be configured to locate the vehicle 102A using the infrastructure UWB anchors 114 and the vehicle-based UWB anchors 116.

A vehicle 102B is also located near the intersection 200. The vehicle 102B may be subscribed to receive the location of the VRU from the UWB gateway 118. This may allow the vehicle 102B to compute its routing through the intersection 200 with the benefit of understanding the location of the VRU. It should be noted that this is only an example, and other vehicles 102, mobile devices 106, remote servers, or other devices may be subscribed to receive the location of the VRU.

Figure 3:
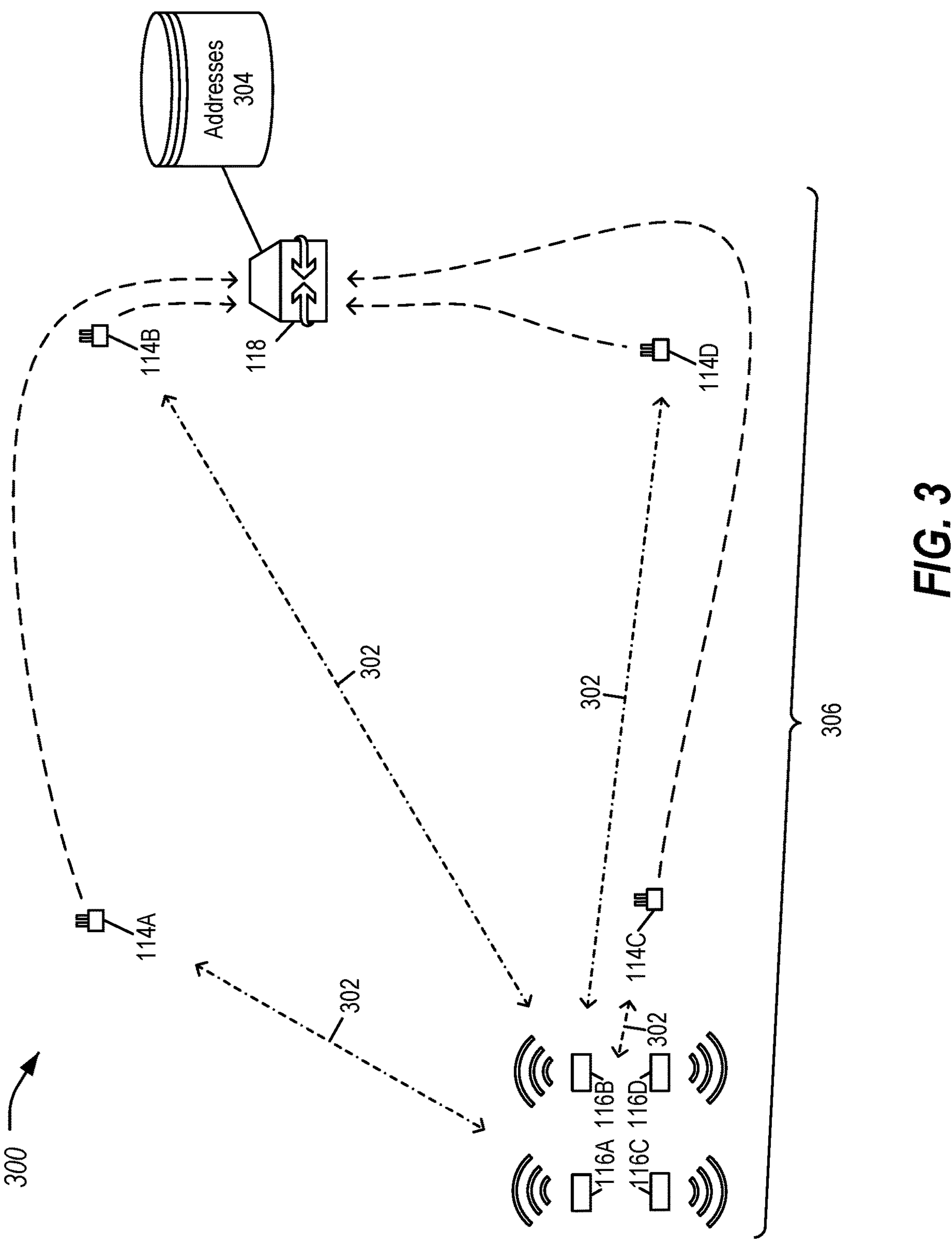
FIG. 3 illustrates an example of the vehicle-based UWB anchors advertising their presence to the UWB gateway for use in the network of UWB infrastructure.

FIG. 3 illustrates an example 300 of the vehicle-based UWB anchors 116 advertising their presence to the UWB gateway 118 for use in the network of UWB infrastructure. As shown, the vehicle-based UWB anchors 116 may be configured to advertise their presence in a beacon mode which the intersection-based infrastructure UWB anchors 114 listen to. These beacon transmissions 302 may include information such as identifiers of the vehicle-based UWB anchors 116. Using signals received from the beacon transmissions 302 from the vehicle-based UWB anchors 116, the infrastructure UWB anchors 114 may compute precise distance and angle measurements of the locations of the vehicle-based UWB anchors 116.

The presence and locations of the vehicle-based UWB anchors 116 may be indicated to the UWB gateway 118. Based on the locations, the UWB gateway 118 may include the detected vehicle-based UWB anchors 116 in the existing anchor network of infrastructure UWB anchors 114. This may be accomplished, in an example, by adding the addresses of the vehicle-based UWB anchors 116 to a database of addresses 304. The database of addresses 304 may contain the addresses of all of the UWB anchors that define a mesh 306 to be used in location (whether infrastructure UWB anchors 114 or vehicle-based UWB anchors 116) In an example, the UWB gateway 118 may receive the information about the vehicle-based UWB anchors 116 from the infrastructure UWB anchors 114, and may compare the locations to a predefined threshold distance from the intersection 200. If the vehicle-based UWB anchors 116 are within the distance (and/or other parameters of the vehicle-based UWB anchors 116 such as signal strength meet UWB gateway 118 parameters), the vehicle-based UWB anchors 116 may be determined to be available for use by the UWB gateway 118.

Additionally, if vehicle-based UWB anchors 116 that are determined to no longer be available, those vehicle-based UWB anchors 116 may be removed from consideration. This may be accomplished, in an example, by removing those addresses of the vehicle-based UWB anchors 116 from the database of addresses 304. For instance, in one example, the vehicle-based UWB anchors 116 may automatically be removed from consideration after a expiration of a predefined timeout period. Or, in another example, the vehicle-based UWB anchor 116, may communicate a message to the infrastructure UWB anchors 114 removing the vehicle-based UWB anchor 116 from the listing. Or, in yet another example, the vehicle-based UWB anchor 116 may be identified by the infrastructure UWB anchors 114 as having moved or as no longer having sufficient signal strength to be usable by the UWB gateway 118.

Using these techniques, the vehicle-based UWB anchors 116 of the vehicle 102A temporarily present near the intersection 200 may be joined to the network of infrastructure UWB anchors 114 already present at the intersection 200, to provide for a larger and more complete combined network of anchors. Thus may provide more accurate positioning and/or positioning over a larger range than through using the infrastructure UWB anchors 114 alone without the vehicle-based UWB anchors 116.

It should be noted that the approach may provide for key-off load management for participating parked vehicles 102 by providing options for the vehicle 102 to opt in or out from participating in the based on the charge levels for electric vehicles 102 (EVs), amount of time spent at the intersection 200 (e.g., based on SPaT information, etc.).

As another possibility, if the vehicle 102 has multiple anchors, the vehicle 102 may offer some or all of them to the UWB gateway 118 based on its location relative to the intersection 200 (e.g., based off MAP information broadcast from the intersection 200 infrastructure that indicates the positioning of the intersection 200). For instance, the vehicles 102 may offer its vehicle-based UWB anchors 116 that are closest to the infrastructure UWB anchors 114, as the infrastructure UWB anchors 114 that are on the far side of the vehicle 102A from the infrastructure UWB anchors 114 may not be usable by the UWB gateway 118. As yet another possibility, the vehicle 102 may only provide a subset or none of the vehicle-based UWB anchors 116 if the vehicle 102 battery charge levels is low.

Figure 4:
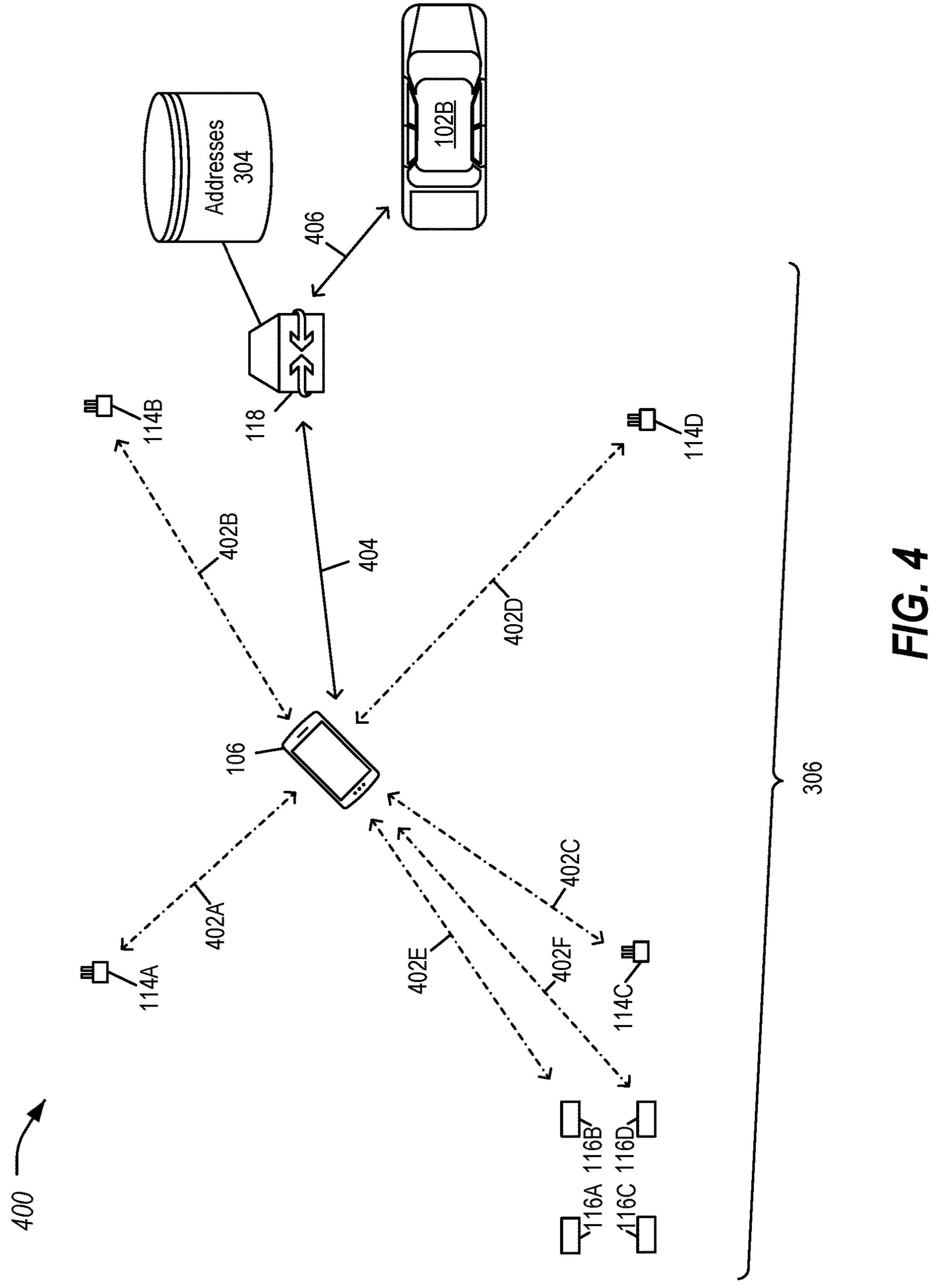
FIG. 4 illustrates an example of using a combination of the infrastructure UWB anchors and the vehicle-based UWB anchors to locate the mobile device.

FIG. 4 illustrates an example 400 of using a combination of the infrastructure UWB anchors 114 and the vehicle-based UWB anchors 116 to locate the mobile device 106. The mobile device 106, using its mobile UWB transceiver 108 as a UWB tag, may calculate its relative position 404 with respect to both the infrastructure UWB anchors 114 and the vehicle-based UWB anchors 116. The mobile device 106 may send the relative position 404 to the UWB gateway 118. The UWB gateway 118 may convert the received relative position 404 to an absolute GNSS position based on its knowledge of the location of the infrastructure UWB anchors 114 and/or vehicle-based UWB anchors 116. This absolute position 408 may be shared to subscribed vehicle 102B and/or to the mobile device 106, which may use this accurate absolute position 408 for various tasks.

Figure 5:
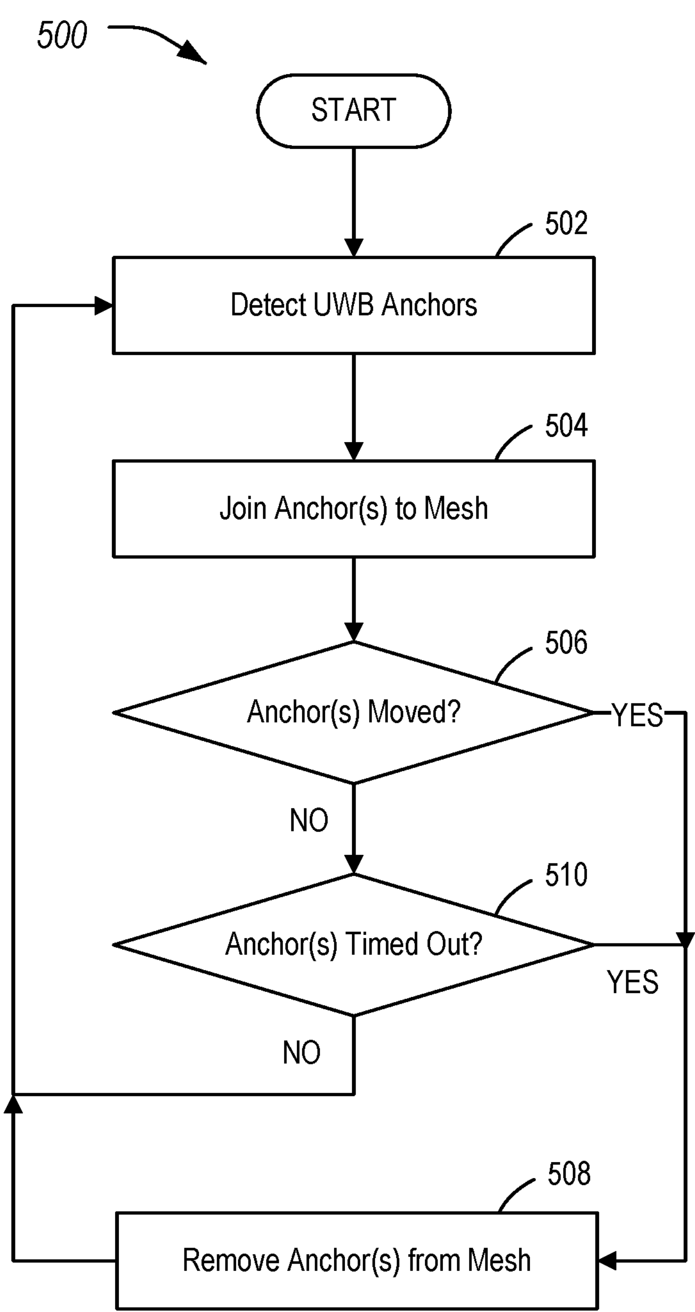
FIG. 5 illustrates an example process for the creation of a group of static infrastructure UWB anchors and dynamic vehicle-based UWB anchors for use in precise positioning.

FIG. 5 illustrates an example process 500 for the creation of a group of static infrastructure UWB anchors 114 and dynamic vehicle-based UWB anchors 116 for use in precise positioning. In an example, the process 500 may be performed by the infrastructure components, such as the infrastructure UWB anchors 114 and the UWB gateway 118 installed along a roadway, such as at an intersection 200.

At operation 502, the UWB gateway 118 detects one or more vehicle-based UWB anchors 116 using the fixed-location infrastructure UWB anchors 114. The one or more vehicle-based UWB anchors 116 may include components of a vehicle 102 used for access control to the vehicle 102. In an example, the infrastructure UWB anchors 114 may receive beacon transmissions 302 from the vehicle-based UWB anchors 116.

The beacon transmissions 302 may include information such as identifiers of the vehicle-based UWB anchors 116. Using signals received from the beacon transmissions 302 from the vehicle-based UWB anchors 116, the infrastructure UWB anchors 114 may compute information such as time-of-flight (ToF), range, time difference of arrival (TDoA), and phase difference of arrival (PDoA). The infrastructure UWB anchors 114 may send those detections to the UWB gateway 118, which may use the detections and the coordinates of the vehicle-based UWB anchors 116 to determine the locations of the vehicle-based UWB anchors 116.

At operation 504, the UWB gateway 118 joins the one or more vehicle-based UWB anchors 116 to the mesh 306 of UWB anchors 114A for locating mobile devices 106. In an example, the UWB gateway 118 may add, to the database of addresses 304, the one or more vehicle-based UWB anchors 116 that are within a predefined distance threshold from the infrastructure UWB anchors 114. For instance, this may be a predefined maximum distance from a center of the intersection 200. Or, this may be a predefined maximum distance from any of the infrastructure UWB anchors 114 of the intersections 200. Thus, the mesh 306 of UWB anchors 114A includes both the fixed-location infrastructure UWB anchors 114 and the dynamic vehicle-based UWB anchors 116.

At operation 506, the UWB gateway 118 determines whether any of the vehicle-based UWB anchors 116 have moved away from the infrastructure UWB anchors 114. This may be determined based on the beacon transmissions 302, similar to as discussed above with respect to operation 502. The vehicle-based UWB anchors 116 may move based on driving of the vehicle 102, and if the vehicle 102 has moved, it may no longer be desirable to include the vehicle-based UWB anchors 116 in the mesh 306. If any of the vehicle-based UWB anchors 116 have moved (or if any of the vehicle-based UWB anchors 116 no longer having sufficient signal strength to be usable for locating mobile devices 106), control passes to operation 508 to remove those vehicle-based UWB anchors 116 from the database of addresses 304 for the mesh 306. In the alternative, control may return to operation 504 to establish whether the new location of the vehicle-based UWB anchor 116 is within the predefined distance threshold, and if so, whether the vehicle-based UWB anchor 116 should be maintained within the mesh 306 at the new location.

At operation 510, the UWB gateway 118 determines whether any of the vehicle-based UWB anchors 116 have timed out. For example, responsive to a predefined timeout period, the UWB gateways 118 may periodically remove those vehicle-based UWB anchors 116 that have been included in the mesh 306 for at least a predefined maximum time period. This time may be default timeout for all vehicle-based UWB anchors 116 (such as one minute, one hour, etc.). Or, the specific time for using the vehicle-based UWB anchors 116 may be indicated by the vehicle-based UWB anchors 116 to the UWB gateway 118, e.g., based on the vehicle 102 indicating an expected duration of time for the vehicle 102 to be parked near the intersection 200. In yet a further example, the duration may be determined by third-party devices, such as via a parking meter sending remaining paid parking time to the UWB gateway 118. If any of the vehicle-based UWB anchors 116 have timed out, control passes to operation 508 to remove those vehicle-based UWB anchors 116 from the mesh 306.

Otherwise, control returns to operation 502 to continue detecting vehicle-based UWB anchors 116. After operation 508, control also returns to operation 502 to continue vehicle-based UWB anchors 116. It should be noted that the operations of the process 500 are shown as discrete operations, but one or more of the operations may be performed in a different order and/or concurrently to one another.

Figure 6:
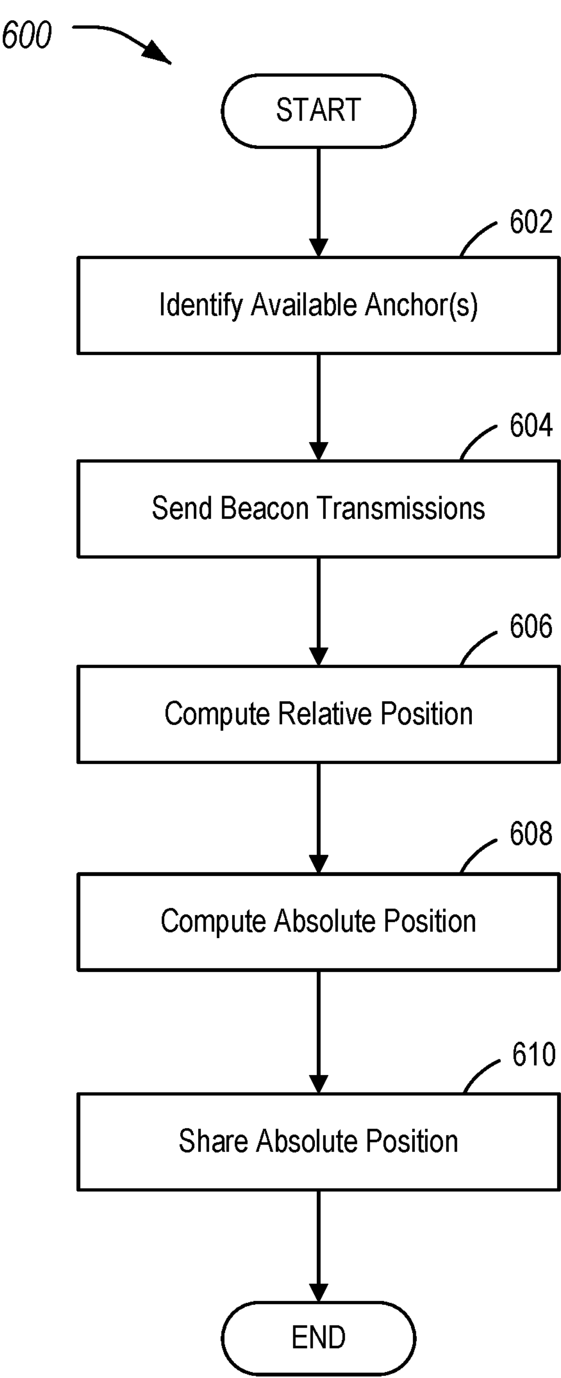
FIG. 6 illustrates an example process using the group of static infrastructure UWB anchors and dynamic vehicle-based UWB anchors for determining an absolute position of the mobile device.

FIG. 6 illustrates an example process 600 using the group of static infrastructure UWB anchors 114 and dynamic vehicle-based UWB anchors 116 for determining an absolute position 408 of the mobile device 106.

At operation 602, the mobile device 106 identifies the available infrastructure UWB anchors 114 and vehicle-based UWB anchors 116. In an example, the mobile device 106 receives information broadcast from the UWB gateway 118 or other intersection 200 infrastructure. This information may indicate the addresses 304 of the infrastructure UWB anchors 114 and vehicle-based UWB anchors 116 that are within the mesh 306 and available for use for location services.

At operation 604, the mobile device 106 sends beacon transmissions 302 to the available anchors. These beacon transmissions 302 may be received by the infrastructure UWB anchors 114 and also the vehicle-based UWB anchors 116. Operating as a tag, the mobile device 106 may initiate two-way ranging by sending a poll message with the addresses of the infrastructure UWB anchors 114 and vehicle-based UWB anchors 116. The anchors records the time that the poll message is received and send a response.

At operation 606, the mobile devices 106 computes its relative position 404 based on the anchors. As the mobile device 106 receives responses, the mobile device 106 may calculate the signal ToF based on the signal round-trip time and the time it took for the anchor to process and reply to the initial poll message. The distance may be calculated by multiplying the ToF by the speed of light. With multiple anchors, two-way ranging can be used to determine the position of the mobile device 106 or other tags.

At operation 608, the absolute position 408 of the mobile device 106 is computed. In an example, if the locations of the infrastructure UWB anchors 114 and vehicle-based UWB anchors 116 are shared with the mobile device 106 by the UWB gateway 118, the mobile device 106 itself may compute its absolute position 408 using the known locations of the anchors. In another example, if the locations are not shared, the mobile device 106 may send the relative position 404 information to the UWB gateway 118, which may then computer the absolute position 408 using the known locations of the anchors.

At operation 610, the absolute position 408 of the mobile device 106 is shared to other devices. In an example, the location of the mobile device 106 may be shared via broadcast messages to be received by any vehicles 102 in the vicinity of the intersection 200. In another example, vehicles 102 may subscribe to the UWB gateway 118 to receive locations of any present mobile devices 106 as the vehicle 102 traverses the intersection 200, and may unsubscribe once the vehicle 102 has passed the intersection 200. After operation 810, the process 800 ends.

Thus, the disclosed approach provides innovative use of existing in-vehicle UWB anchors to help dynamically scale the UWB positioning at an intersection. As the number of UWB anchors present is increased, better accuracy may be achieved in the positioning of mobile devices 106 operating as a tag. This approach provides a unique way to incorporate the vehicle-based UWB anchors 116, to seamlessly participate with the infrastructure UWB anchors 114 to enhance performance and coverage, and without requiring additional hardware.

Figure 7:
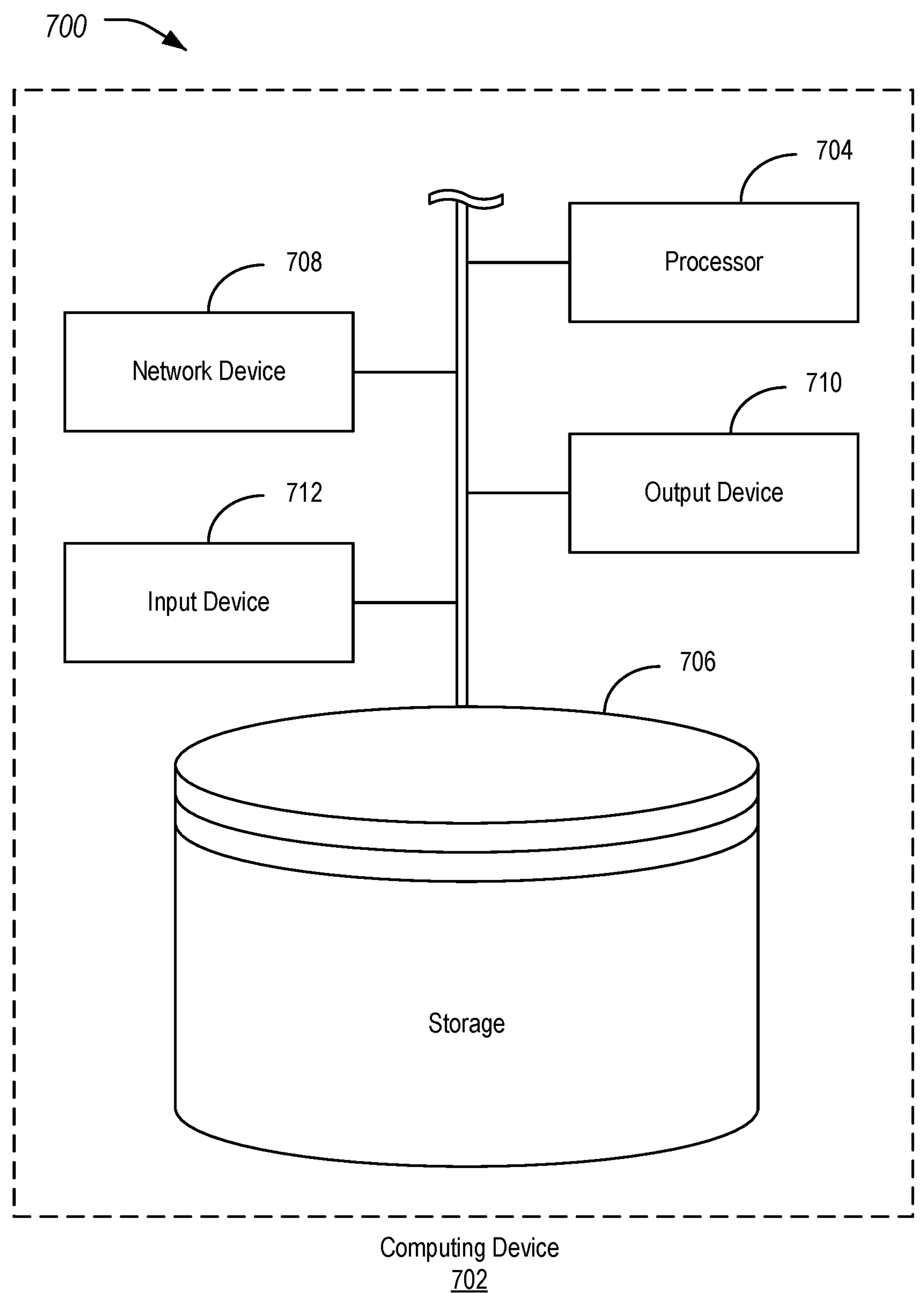
FIG. 7 illustrates an example of a computing device for implementing aspects of the precise positioning using dynamic vehicle-based UWB anchors.

FIG. 7 illustrates an example 700 of a computing device 702 for implementing aspects of the precise path-based passive entry. Referring to FIG. 7, and with reference to FIGS. 1-6, the vehicle 102, ECUs 104, mobile device 106, mobile UWB transceiver 108, mobile GNSS controller 110, cellular transceivers 112, infrastructure UWB anchors 114, vehicle-based UWB anchors 116, UWB gateway 118, UWB controller 120, vehicle GNSS controller 122, and TCU 126 may be examples of such computing devices 702. As shown, the computing device 702 includes a processor 704 that is operatively connected to a storage 706, a network device 708, an output device 710, and an input device 712. It should be noted that this is merely an example, and computing devices 702 with more, fewer, or different components may be used.

The processor 704 may include one or more integrated circuits that implement the functionality of a central processing unit (CPU) and/or graphics processing unit (GPU). In some examples, the processors 704 are a system on a chip (SoC) that integrates the functionality of the CPU and GPU. The SoC may optionally include other components such as, for example, the storage 706 and the network device 708 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 704 executes stored program instructions, such as those of the positioning application 124, that are retrieved from the storage 706. The stored program instructions, accordingly, include software that controls the operation of the processors 704 to perform the operations described herein. The storage 706 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 710. The output device 710 may include a graphical or visual display device, such as an electronic display screen, projector, printer, or any other suitable device that reproduces a graphical display. As another example, the output device 710 may include an audio device, such as a loudspeaker or headphone. As yet a further example, the output device 710 may include a tactile device, such as a mechanically raiseable device that may, in an example, be configured to display braille or another physical output that may be touched to provide information to a user.

The input device 712 may include any of various devices that enable the computing device 702 to receive control input from users. Examples of suitable input devices that receive human interface inputs may include keyboards, mice, trackballs, touchscreens, voice input devices, graphics tablets, and the like.

The network devices 708 may each include any of various devices that enable the vehicle 102. ECUs 104, mobile device 106, mobile UWB transceiver 108, mobile GNSS controller 110, cellular transceivers 112, infrastructure UWB anchors 114, vehicle-based UWB anchors 116, UWB gateway 118, UWB controller 120, vehicle GNSS controller 122, and TCU 126 to send and/or receive data from external devices over networks. Examples of suitable network devices 708 include an Ethernet interface, a Wi-Fi transceiver, a cellular transceiver, or a BLUETOOTH or BLE transceiver, UWB transceiver, or other network adapter or peripheral interconnection device that receives data from another computer or external data storage device, which may be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for localization using a dynamic mesh of vehicle-based Ultra-Wide Band (UWB) anchors, comprising:

detecting one or more vehicle-based UWB anchors using fixed-location infrastructure UWB anchors, the one or more vehicle-based UWB anchors being components of a vehicle used for access control to the vehicle;

joining the one or more vehicle-based UWB anchors to a mesh of UWB anchors for locating mobile devices, the mesh of UWB anchors including both the fixed-location infrastructure UWB anchors and the vehicle-based UWB anchors; and using the mesh of UWB anchors to determine an absolute position of a mobile device.

2. The method of claim 1, further comprising:

maintaining a database of addresses of each of the UWB anchors in the mesh; and sending the addresses to the mobile device to allow the mobile device to perform ranging between the mobile device and each of the UWB anchors in the mesh.

3. The method of claim 1, further comprising filtering the one or more vehicle-based UWB anchors to include, in the mesh, the one or more vehicle-based UWB anchors within a predefined distance threshold.

4. The method of claim 1, further comprising removing the one or more vehicle-based UWB anchors responsive to receiving a message from the vehicle to the infrastructure UWB anchors requesting removal of one of the vehicle-based UWB anchors from the mesh.

5. The method of claim 1, further comprising removing the one or more vehicle-based UWB anchors responsive to the one or more vehicle-based UWB anchors being identified by the infrastructure UWB anchors as having moved or as no longer having sufficient signal strength to be usable by a UWB gateway.

6. The method of claim 1, further comprising removing the one or more vehicle-based UWB anchors responsive to occurrence of a predefined timeout period.

7. The method of claim 1, further comprising determining by a UWB gateway, the absolute position of the mobile device using a relative position of the mobile device determined using the mesh of UWB anchors and information regarding locations of the UWB anchors of the mesh.

8. The method of claim 1, further comprising:

subscribing, by a second vehicle, to receive the absolute position of the mobile device as computed by the mesh; and sending the absolute position of the mobile device to the second vehicle.

9. A system for localization using a dynamic mesh of vehicle-based Ultra-Wide Band (UWB) anchors, comprising:

a plurality of fixed-location infrastructure UWB anchors; and a UWB gateway, configured to:

detect one or more vehicle-based UWB anchors using the fixed-location infrastructure UWB anchors, the one or more vehicle-based UWB anchors being components of a vehicle used for access control to the vehicle, join the one or more vehicle-based UWB anchors to a mesh of UWB anchors for locating mobile devices, the mesh of UWB anchors including both the fixed-location infrastructure UWB anchors and the vehicle-based UWB anchors, and use the mesh of UWB anchors to determine an absolute position of a mobile device.

10. The system of claim 9, further comprising a database, wherein the UWB gateway is further configured to:

maintain, in the database, addresses of each of the UWB anchors in the mesh; and send the addresses to the mobile device to allow the mobile device to perform ranging between the mobile device and each of the UWB anchors in the mesh.

11. The system of claim 9, wherein the UWB gateway is further configured to filter the one or more vehicle-based UWB anchors to include, in the mesh, the one or more vehicle-based UWB anchors within a predefined distance threshold.

12. The system of claim 9, wherein the UWB gateway is further configured to remove the one or more vehicle-based UWB anchors responsive to receiving a message from the vehicle to the infrastructure UWB anchors requesting removal of one of the vehicle-based UWB anchors from the mesh.

13. The system of claim 9, wherein the UWB gateway is further configured to remove the one or more vehicle-based UWB anchors responsive to the one or more vehicle-based UWB anchors being identified by the infrastructure UWB anchors as having moved or as no longer having sufficient signal strength to be usable by the UWB gateway.

14. The system of claim 9, wherein the UWB gateway is further configured to remove the one or more vehicle-based UWB anchors responsive to occurrence of a predefined timeout period.

15. The system of claim 9, wherein the UWB gateway is further configured to determine the absolute position of the mobile device using a relative position of the mobile device determined using the mesh of UWB anchors and information regarding locations of the UWB anchors of the mesh.

16. The system of claim 9, wherein the UWB gateway is further configured to:

subscribe, by a second vehicle, to receive the absolute position of the mobile device as computed by the mesh; and send the absolute position of the mobile device to the second vehicle.

17. A non-transitory computer-readable medium comprising instructions for localization using a dynamic mesh of vehicle-based Ultra-Wide Band (UWB) anchors that, when executed by a UWB gateway, cause the UWB gateway to perform operations including to:

detect one or more vehicle-based UWB anchors using fixed-location infrastructure UWB anchors, the one or more vehicle-based UWB anchors being components of a vehicle used for access control to the vehicle;

join the one or more vehicle-based UWB anchors to a mesh of UWB anchors for locating mobile devices, the mesh of UWB anchors including both the fixed-location infrastructure UWB anchors and the vehicle-based UWB anchors, including to maintain addresses of each of the UWB anchors in the mesh; and use the mesh of UWB anchors to determine an absolute position of a mobile device, including to send the addresses to the mobile device to allow the mobile device to perform ranging between the mobile device and each of the UWB anchors in the mesh and to determine the absolute position of the mobile device using a relative position of the mobile device determined using the mesh of UWB anchors and information regarding locations of the UWB anchors of the mesh.

18. The non-transitory computer-readable medium of claim 17, further comprising instructions that, when executed by the UWB gateway, cause the UWB gateway to perform operations including to filter the one or more vehicle-based UWB anchors to include, in the mesh, the one or more vehicle-based UWB anchors within a predefined distance threshold.

19. The non-transitory computer-readable medium of claim 17, further comprising instructions that, when executed by the UWB gateway, cause the UWB gateway to perform operations including to one or more of:

remove the one or more vehicle-based UWB anchors responsive to receiving a message from the vehicle to the infrastructure UWB anchors requesting removal of one of the vehicle-based UWB anchors from the mesh;

remove the one or more vehicle-based UWB anchors responsive to the one or more vehicle-based UWB anchors being identified by the infrastructure UWB anchors as having moved or as no longer having sufficient signal strength to be usable by the UWB gateway; or remove the one or more vehicle-based UWB anchors responsive to occurrence of a predefined timeout period.

20. The non-transitory computer-readable medium of claim 17, further comprising instructions that, when executed by the UWB gateway, cause the UWB gateway to perform operations including to:

subscribe, by a second vehicle, to receive the absolute position of the mobile device as computed by the mesh; and send the absolute position of the mobile device to the second vehicle.

* * * * *